United States Patent Office 3,063,978
Patented Nov. 13, 1962

3,063,978
SOLID POLYMERS OF 3,5-DIMETHYL-1 VINYL PYRAZOLE
John W. Lynn, Charleston, W. Va., assignor to Union Carbide Corporation, a corporation of New York
No Drawing. Filed Nov. 27, 1959, Ser. No. 855,547
1 Claim. (Cl. 260—88.3)

This invention relates to 1-vinylpyrazole compounds, and polymers thereof, as new compositions of matter, and to processes for their production.

The novel 1-vinylpyrazole compounds of this invention can be graphically depicted by the general formula:

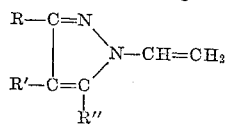

wherein R, R' and R" are radicals selected from the group consisting of hydrogen, phenyl and alkyl radicals having from 1 to 12 carbon atoms. When R, R' and R" are alkyl radicals, they preferably have from 1 to 6 carbon atoms. Illustrative examples of the novel 1-vinylpyrazole compounds of this invention are such compounds as: 1-vinylpyrazole; 3,5-dimethyl-1-vinylpyrazole; 3,4,5-trimethyl-1-vinylpyrazole; 3-ethyl-1-vinylpyrazole; 3-methyl-5-phenyl-1-vinylpyrazole; 4-amyl-1-vinylpyrazole; 3,4,5-triethyl-1-vinylpyrazole; 3-methyl-5-phenyl-1-vinylpyrazole; 3-hexyl-4-ethyl-1-vinylpyrazole; 3,5-didodecyl-1-vinylpyrazole; 3-(2-ethylhexyl) - 1 - vinylpyrazole and the like.

The novel 1-vinylpyrazole compounds of this invention can be produced by the pyrolysis of 1-(β-acyloxyethyl)-pyrazole compounds. The 1-(β-acyloxyethyl)pyrazole compounds which can be employed as starting materials can be graphically depicted by the general formula:

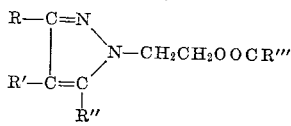

wherein R, R' and R" are as above defined, and R''' is an alkyl radical having from 1 to 3 carbon atoms. Illustrative of the 1-(β-acyloxyethyl)pyrazole compounds suitable for use as starting materials are such compounds as: 1-(β-acetoxyethyl)pyrazole; 3,5-dimethyl - 1 - (β-acetoxyethyl)pyrazole; 3,4,5-trimethyl-1-(β-propionoyloxyethyl)-pyrazole; 3-ethyl-1-(β-butyroyloxyethyl)pyrazole; 3-methyl-5-phenyl-1-(β-acetoxyethyl)pyrazole; 4-amyl-1-(β-acetoxyethyl)pyrazole; 3,4,5-triethyl-1-(β-acetoxyethyl)pyrazole; 3-methyl-5-phenyl-1-(β-acetoxyethyl)pyrazole; 3-hexyl-4-ethyl-1-(β-acetoxyethyl)pyrazole; 3,5-didodecyl-1-(β-propionoyloxyethyl)pyrazole; 3-(2-ethylhexyl-1-(β-butyrolyoxyethyl)pyrazole and the like.

The 1-(β-acyloxyethyl)pyrazole compounds which can be employed as starting materials in the process of the instant invention can be prepared by the reaction of a 1-(β-hydroxyethyl)pyrazole compound with an acid anhydride, such as acetic anhydride, propionic anhydride and butyric anhydride. The 1-(β-hydroxyethyl)pyrazole compounds employed in such reaction can be prepared by the reaction of ethylene oxide with pyrazole or a substituted derivative thereof. By way of illustration, 3,5-dimethyl-1-(β-acetoxyethyl)pyrazole (III) can be prepared by heating a mixture of ethylene oxide and 3,5-dimethyl-pyrazole (I) at a temperature of from about 50° C. to about 125° C., recovering 3,5-dimethyl-1-(β-hydroxyethyl)pyrazole (II) from the reaction mixture, and then heating this product with acetic anhydride at a temperature of from about 50° C. to about 150° C. The stepwise preparation of 3,5-dimethyl-1-(β-acetoxyethyl)pyrazole can be depicted by the following equations:

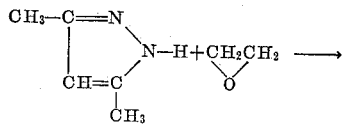

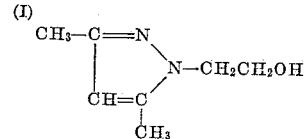

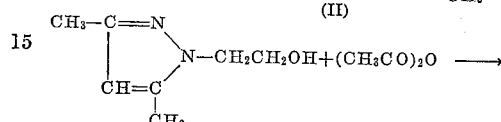

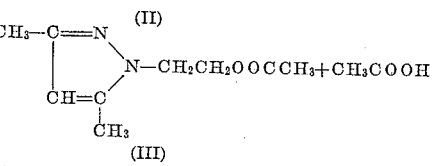

The pyrolysis of 1-(β-acyloxyethyl)pyrazole compounds according to the process of the instant invention can be illustrated by the following graphic equation:

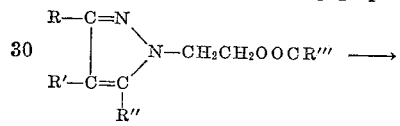

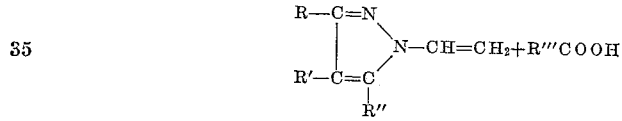

wherein R, R', R" and R''' are as above defined. Thus, for example, 1-vinylpyrazole can be prepared by the pyrolysis of 1-(β-acetoxyethyl)pyrazole, and 3,5-dimethyl-1-vinylpyrazole can be prepared by the pyrolysis of 3,5-dimethyl-1-(β-acetoxyethyl)pyrazole.

The pyrolysis of 1-(β-acyloxyethyl)pyrazole compounds according to the process of the instant invention can be conveniently achieved by passing such compounds through a heated reaction tube. The contact time necessary will, of course, vary with the temperature in the tube, but is usually no longer than 30 seconds in duration. Pyrolysis can be conducted at temperatures ranging from as low as 450° C. to as high as 600° C., but is preferably conducted at temperatures ranging from 500° C. to 550° C. If desired, an inert gas, such as nitrogen or argon, can be introduced into the reaction tube during pyrolysis.

Atmospheric pressure is usually employed in effecting the pyrolysis of 1-(β-acyloxyethyl)pyrazole compounds according to the process of the instant invention. However, pressures both above and below atmospheric pressure, for example pressures ranging from as low as 100 mm. Hg to as high as 100 p.s.i., can also be employed.

The pyrolysis of 1-(β-acyloxyethyl)pyrazole compounds according to the process of the instant invention may be effected in an inert liquid solvent. By an inert liquid solvent is meant a liquid solvent in which the starting material is soluble and which itself is non-reactive under the conditions of the reaction. Illustrative of the inert liquid solvents which can be employed are such compounds as hexane, cyclohexane, heptane, benzene, toluene and the like. In general, an amount of solvent ranging from 0 to 10 times, preferably from 1 to 3 times, the weight of starting material present can be effectively employed.

The novel 1-vinylpyrazole compounds of this invention find wide use in the preparation of polymeric materials. Thus, such compounds, because of the vinyl group present therein, can be readily homopolymerized, or copolymerized with one or more polymerizable organic compounds, such as styrene, butadiene, methyl acrylate, methyl methacrylate, vinyl acetate, vinyl chloride, vinylidene chloride, acrylonitrile, methacrylonitrile, vinylidene cyanide, acrylamide, methacrylamide, maleic anhydride, N-vinyl acetamide, vinyl methyl ether and the like. The term "polymer" as used throughout this specification, is intended to encompass both the homopolymers of the novel 1-vinylpyrazole compounds of this invention, and the copolymers of such compounds with one or more other polymerizable organic compounds.

Polymerization of the novel 1-vinylpyrazole compounds of this invention can be effected by conventional means, either by bulk, solution or emulsion processes. Polymerization can be effected by means of heat, light, or a suitable vinyl polymerization catalyst, such as a peroxide or azo compound. Preferably, polymerization is effected by heating in the presence of a polymerization catalyst in order to shorten the reaction time. Temperatures ranging from as low as 0° C. to as high as 125° C. are generally effective for this purpose. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Illustrative examples of azo compounds which can be employed as catalysts include $\alpha,\alpha'$-azo-bis-isobutyronitrile and 2,2-dicyano-bis-azobenzene, and the like. Suitable inert liquid solvents which can be employed as diluents are such compounds as acetonitrile, benzene, toluene, xylene, and the like.

The copolymers obtained by copolymerizing the novel 1-vinylpyrazole compounds of this invention can contain from as low as 0.5 molar percent to as high as 99.5 molar percent of combined pyrazole compound.

The polymeric materials produced by polymerizing the novel 1-vinylpyrazole compounds of this invention are useful in forming films, fibers and coatings, and as agents for bonding nylon to rubber.

The following examples are set forth for purposes of illustration so that those skilled in the art may better understand this invention, and it should be understood that they are not to be construed as limiting this invention in any manner.

EXAMPLE I

*Preparation of 3,5-Dimethyl-1-($\beta$-Acetoxyethyl)pyrazole*

An admixture of 50 grams (0.36 mole) of 3,5-dimethyl-1-($\beta$-hydroxyethyl)pyrazole and 150 ml. (1.59 moles) of acetic anhydride was prepared and stirred at a temperature of 110° C. for three hours. At the end of this time, the reaction mixture was distilled and 42 grams of 3,5-dimethyl-1-($\beta$-acetoxyethyl)pyrazole boiling at a temperature of 100° C. at 3 mm. Hg pressure were collected. This represented a yield of about 63 percent of theoretical. This material had a density of 1.0855 and an index of refraction of 1.4732 at 30° C., and was further identified by its infrared absorption spectrum and chemical analysis.

*Analysis.*—Calculated for $C_9H_{14}N_2O_2$: C, 59.3%; H, 7.68%; N, 15.38%. Found: C, 58.78%; H, 7.43%; N, 15.06%.

In a similar manner, 1-($\beta$-acetoxyethyl)pyrazole is produced by substituting 1-($\beta$-hydroxyethyl)pyrazole for 3,5-dimethyl-1-($\beta$-hydroxyethyl)pyrazole.

EXAMPLE II

*Preparation of 3,5-Dimethyl-1-Vinylpyrazole*

An admixture of 34 grams (0.187 mole) of 3,5-dimethyl-1-($\beta$-acetoxyethyl)pyrazole and 78 grams of benzene was prepared and passed through a Pyrex glass tube 84 cm. in length and 1.7 cm. in diameter for an average contact time of 15 seconds. The tube was encased with a jacket containing molten salt which was maintained at a temperature of 525° C. The effluent which emerged from the tube was condensed and 2.0 ml. thereof were titrated with 0.1 N sodium hydroxide and were found to contain 9.22 percent by weight acetic acid. The remaining effluent was fractionally distilled, and 11 grams of 3,5-dimethyl-1-vinylpyrazole boiling at a temperature of 55–64° C., at 4 mm. Hg pressure were collected. This represented a yield of about 48 percent of theoretical. The 3,5-dimethyl-1-vinylpyrazole product had an index of refraction of 1.5068 at 30° C., and was identified by its infrared absorption spectrum and chemical analysis.

*Analysis.*—Calculated for $C_7H_{10}N_2$: C, 68.8%; H, 8.25%; N, 22.9%. Found: C, 68.46%; H, 8.12%; N, 22.3%.

In a similar manner, 1-vinylpyrazole is produced by substituting 1-($\beta$-acetoxyethyl)pyrazole for 3,5-dimethyl-1-($\beta$-acetoxyethyl)pyrazole.

EXAMPLE III

*Copolymerization of 3,5-Dimethyl-1-Vinylpyrazole With Vinylidene Chloride*

To a nitrogen-purged Pyrex polymerization tube 12 inches in length and 14 mm. in diameter there was charged 7.0 grams of vinylidene chloride, 3.0 grams of 3,5-dimethyl-1-vinylpyrazole and 0.1 gram of azo-bis-isobutyronitrile. The tube was again purged with nitrogen, and then sealed and rocked in a bath maintained at a temperature of 50° C. for 2 hours. After cooling, the tube was opened, isopropanol was added to the contents thereof, and the resulting mixture was filtered. The precipitate obtained thereby was dried overnight in a forced air oven at 50° C. The dried precipitate was a white, solid copolymer of 3,5-dimethyl-1-vinylpyrazole and vinylidene chloride, and weighed 1.6 grams. This represented a yield of about 16 percent of the theoretical yield of copolymer. Analysis showed the copolymer composition to be about 55.7 percent by weight of vinylidene chloride and 44.3 percent by weight of 3,5-dimethyl-1-vinylpyrazole. The copolymer had a reduced viscosity of 0.97 in cyclohexanone.

A solid homopolymer of 3,5-dimethyl-1-vinylpyrazole is readily produced in the same manner under the same conditions.

Reduced viscosity ($I_R$) is a measure of the molecular weight of a polymer, and can be defined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution. Measurements were made at 30° C. using cyclohexanone as solvent, and a solution of 0.2 gram of polymer per 100 ml. of solution.

Unless otherwise specified, all parts and percentages, as used throughout this specification, are by weight.

What is claimed is:

A solid homopolymer of 3,5-dimethyl-1-vinylpyrazole.

References Cited in the file of this patent

UNITED STATES PATENTS 2,426,465   Miller _____ Aug. 26, 1947

FOREIGN PATENTS 722,523   Great Britain _____ Jan. 26, 1955

OTHER REFERENCES

Schildknecht: "Vinyl and Related Polymers," Wiley, N.Y. (1952).